(12) United States Patent
Moore

(10) Patent No.: US 7,455,311 B2
(45) Date of Patent: Nov. 25, 2008

(54) RUDDER TRAILER HITCH COVER

(76) Inventor: Frederick Robert Moore, 210 Carolina Blvd., Isle of Palms, SC (US) 29451

( * ) Notice: Subject to any disclaimer, the term of this patent is extended or adjusted under 35 U.S.C. 154(b) by 375 days.

(21) Appl. No.: 11/348,888

(22) Filed: Feb. 7, 2006

(65) Prior Publication Data

US 2007/0182128 A1  Aug. 9, 2007

(51) Int. Cl.
*B60D 1/36* (2006.01)
*B63H 25/06* (2006.01)

(52) U.S. Cl. .................. 280/477; 280/495; 280/506; 280/507; 280/504; 40/591; D12/162; D12/190; D12/214; D12/498; 114/162

(58) Field of Classification Search ............... 280/477, 280/495, 506, 507, 504; D12/162, 190, 214, D12/498; 40/591; 114/162
See application file for complete search history.

(56) References Cited

U.S. PATENT DOCUMENTS

| | | | | |
|---|---|---|---|---|
| 2,628,106 A | * | 2/1953 | Sturwold | 280/441.2 |
| 4,711,192 A | * | 12/1987 | Kooy | 114/162 |
| D401,194 S | * | 11/1998 | Harwood | D12/162 |
| D415,457 S | * | 10/1999 | Young et al. | D12/162 |
| D438,493 S | * | 3/2001 | Mulliniks et al. | D12/162 |
| 6,203,038 B1 | * | 3/2001 | Bernhard | 280/93.502 |
| D452,205 S | * | 12/2001 | Eisenbraun | D12/162 |
| 6,971,663 B1 | * | 12/2005 | Blake | 280/507 |
| 7,029,022 B2 | * | 4/2006 | Moss | 280/491.3 |
| 7,090,237 B1 | * | 8/2006 | Lammers | 280/414.1 |
| 7,204,505 B2 | * | 4/2007 | Moss | 280/491.1 |

* cited by examiner

*Primary Examiner*—Paul N Dickson
*Assistant Examiner*—Marlon A Arce Diaz

(57) ABSTRACT

A Rudder Hitch Cover that simulates a sailboats rudder assembly in appearance and motion. The Rudder Hitch Cover attaches to a vehicles trailer hitch in such a way as to be easily removable. The rudder blade bracket (24) may swing side to side in response to the vehicles motion. The rudder blade (30) may rotate up if contacted by a fixed object such as a curb or speed bump.

7 Claims, 4 Drawing Sheets

RUDDER TRAILER HITCH COVER

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF INVENTION

1. Field of Invention

This invention relates to an ornamental rudder hitch cover designed to be attached to the trailer hitch of a vehicle in such a way as to be removable.

2. Prior Art

Trailer hitches are a very common and available accessory for cars and trucks. A popular trailer hitch assembly design is the receiver hitch that allows for the insertion of different accessories other than trailer hitches. The accessories are often functional such as bike carriers, steps, or platforms. Other popular accessories such as flags, symbols and propellers are ornamental with little or no function.

3. Objects and Advantages

The present invention improves on prior art by providing a distinctive yet subtle way for sailing enthusiasts to display their preferred form of propulsion and show their love of the sport. Prior art for has been limited to stickers and license plate frames that state "I'd rather be sailing".

Motor boaters when not pulling a boat can display their enthusiasm for power boating by installing a propeller hitch cover such as U.S. Pat. No. 6,086,438 to Wang but no effort has been made to provide a way for recreational sailors to distinguish themselves.

The object of this invention is to provide a simple durable and aesthetically pleasing addition to a vehicle that will cover up an unsightly receiver hitch while providing a way for sailors to identify themselves.

These and other objects and advantages of the present invention will become apparent from the subsequent detailed description of the preferred embodiment and the appended claims taken in conjunction with the accompanying drawings.

SUMMARY

This invention relates to an ornamental rudder hitch cover designed to be attached to the trailer hitch of a vehicle in such a way as to be re-movable. In its simplest form the invention will be easily removable and have no moving parts. In some embodiments the rudder blade of the invention will be able to move up if contact is made with an object such as a curb. The preferred embodiment would provide means for the rudder blade to swing up as well as from side to side as a vehicle turns to simulate the functions of a rudder on a sailboat.

Figure 1A:
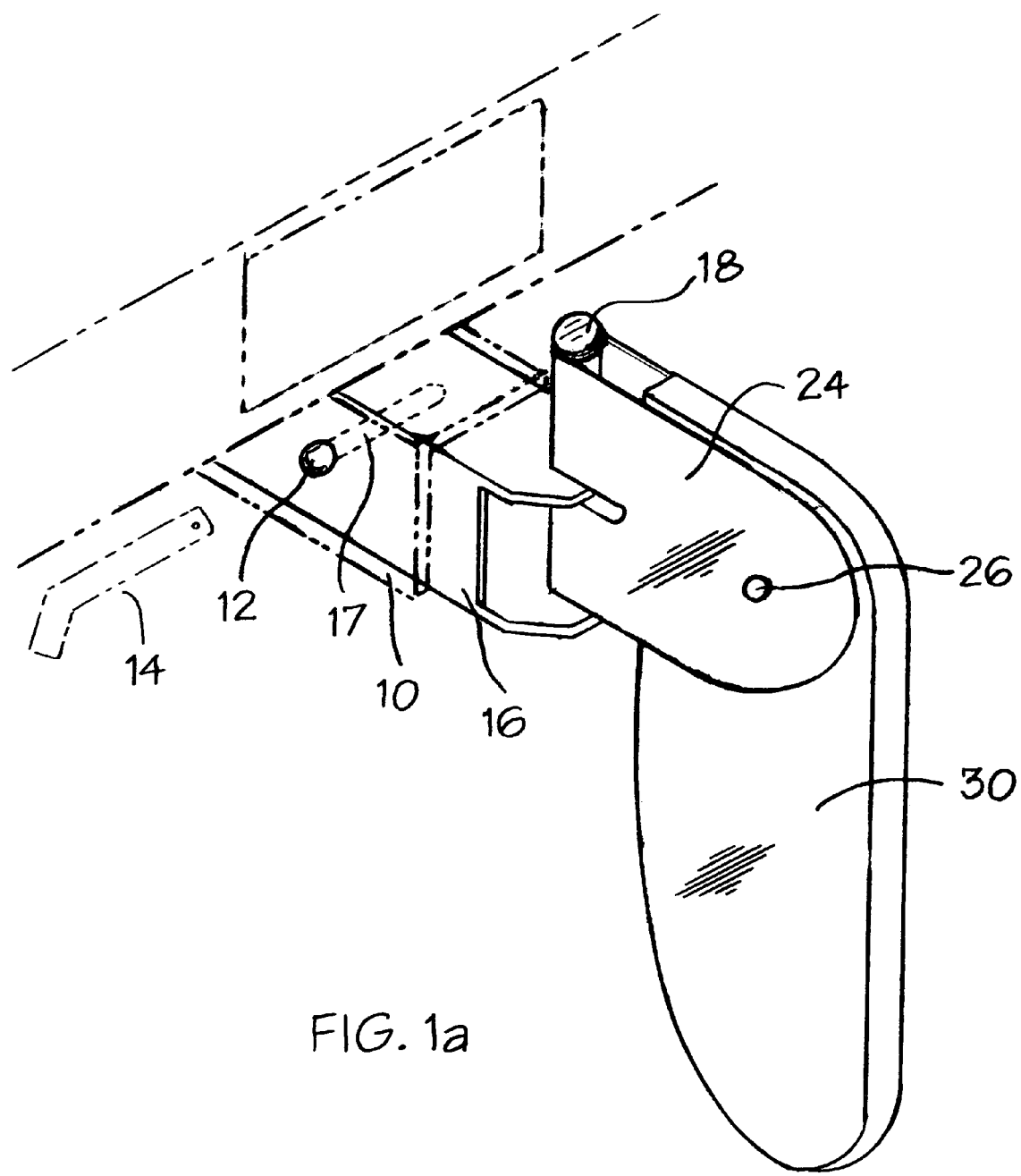
FIG. 1a shows a perspective view of the invention.

DRAWINGS—REFERENCE NUMERALS 10 hitch receiver
12 hitch receiver retaining pin hole
14 hitch receiver retaining pin
16 insert tube
17 insert tube retaining pin bore
18 rudder blade bracket retaining pin
20 rudder blade bracket retaining pin fastener
22 rudder fork
23 rudder fork bore
24 rudder blade bracket
26 rudder blade retaining pin
28 rudder assembly
29 rudder assembly bore
30 rudder blade

DETAILED DESCRIPTION OF THE PREFERRED EMBODIMENTS

Referring first to FIG. 1a, there is shown a perspective view of the preferred embodiment whereby attachment of the invention is complete when the insert tube 16 is inserted into a vehicles trailer hitch receiver 10 and retained with a hitch receiver retaining pin 14 through the retaining pin hole 12 and insert tube retaining pin bore 17.

Figure 1B:
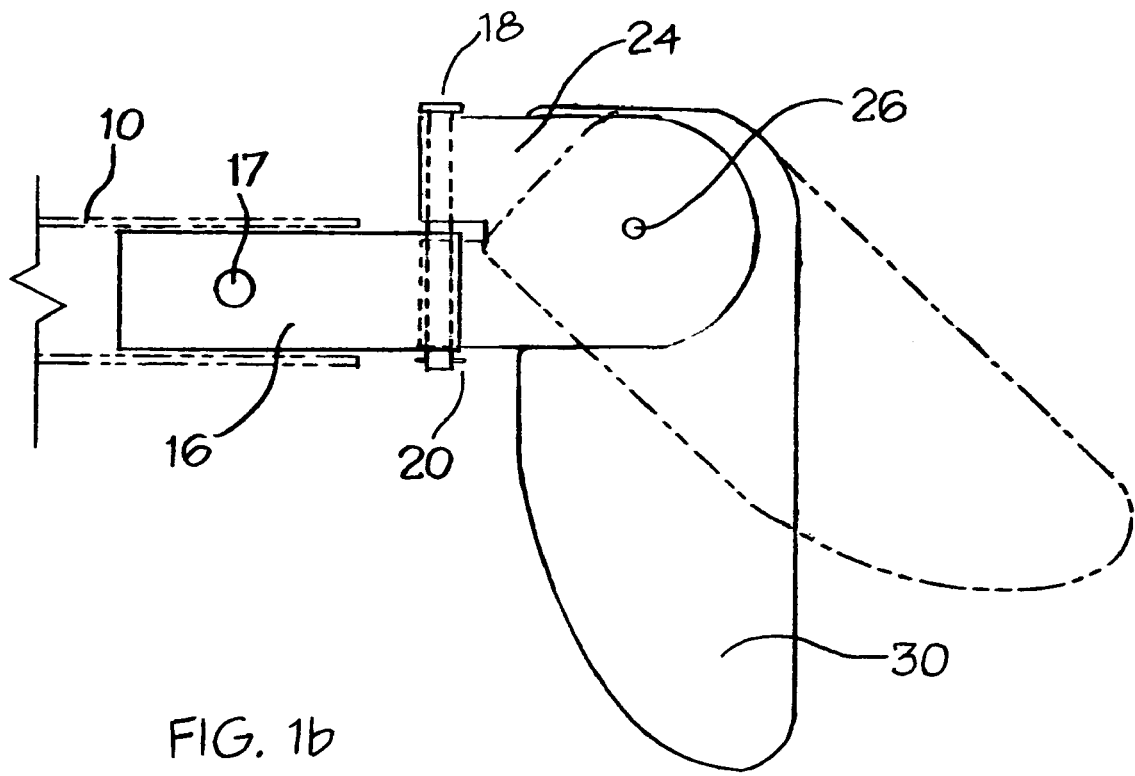
FIG. 1b shows a side view of the invention.

Referring to FIG. 1b, the rudder blade 30 is sandwiched between the faces of the rudder blade bracket 24 and retained by the rudder blade retaining pin 26 so as to allow rotation about the rudder blade retaining pin 26. The rudder blade bracket is attached to the insert tube 16 by means of a rudder blade bracket retaining pin 18 so as to allow a limited rotation about the axis of the rudder bracket retaining pin 18. The retaining pin may be frictionally inserted or secured by a retaining pin fastener 20.

Figure 1C:
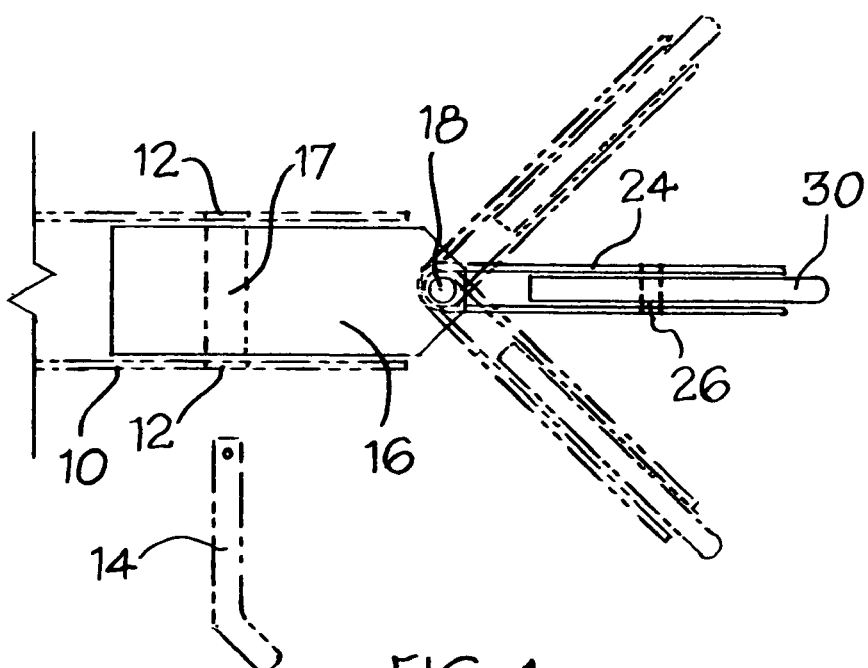
FIG. 1c shows a top view of the invention.

Referring to FIG. 1c, there is shown a top view of the preferred embodiment. The rudder blade 30 is sandwiched between the faces of the rudder bracket 24. The movement of the rudder bracket 24 about the rudder blade bracket retaining pin 18 is indicated.

Figure 2A:
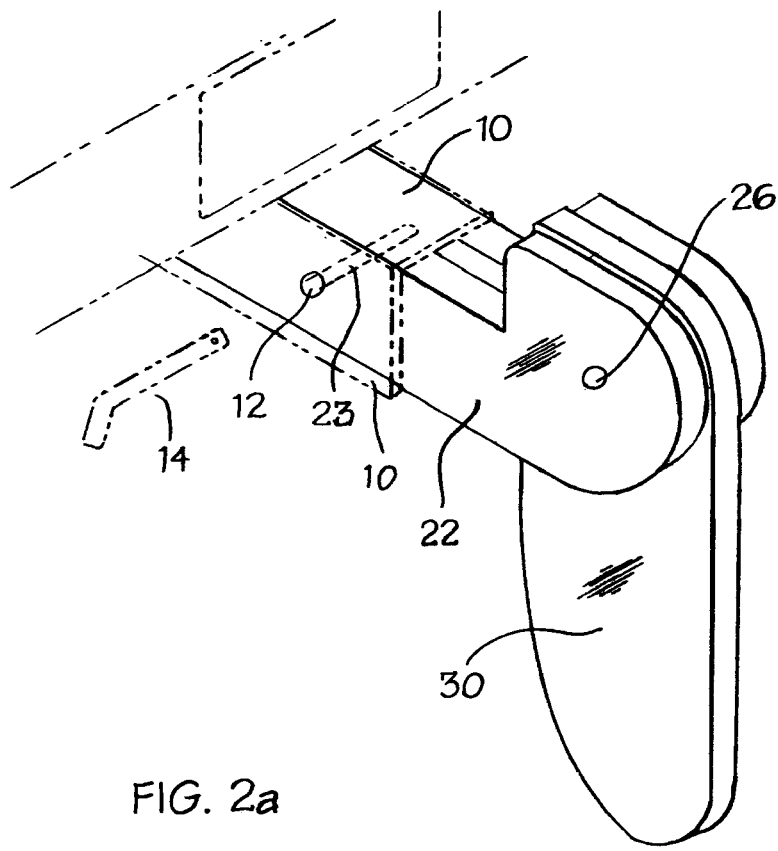
FIG. 2a shows a perspective view of the invention with limited rotation of the rudder blade about the horizontal axis.

Referring to FIG. 2a, there is shown a perspective view of an alternate embodiment whereby the rudder blade bracket and receiver hitch insert is a rigid one piece element to be referred to as the rudder fork 22. Attachment of the invention is complete when the end of the rudder fork 22 is inserted into a vehicles trailer hitch receiver 10 and retained with a hitch receiver retaining pin 14 through the retaining pin hole 12 and rudder fork retaining bore 23

Figure 2B:
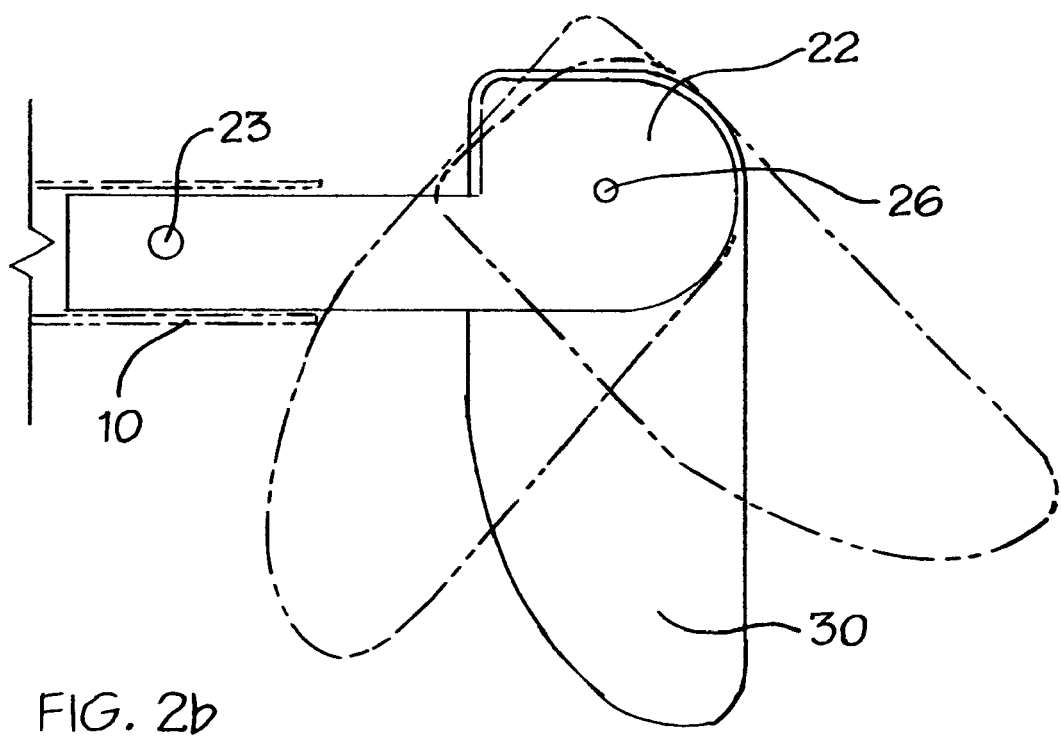
FIG. 2b shows a side view of the invention with limited rotation of the rudder blade about the horizontal axis.

Referring to FIG. 2b, the rudder blade 30 is sandwiched between the faces of the rudder fork 22 and retained by the rudder blade retaining pin 26 so as to allow rotation about the rudder blade retaining pin 26.

Figure 3A:
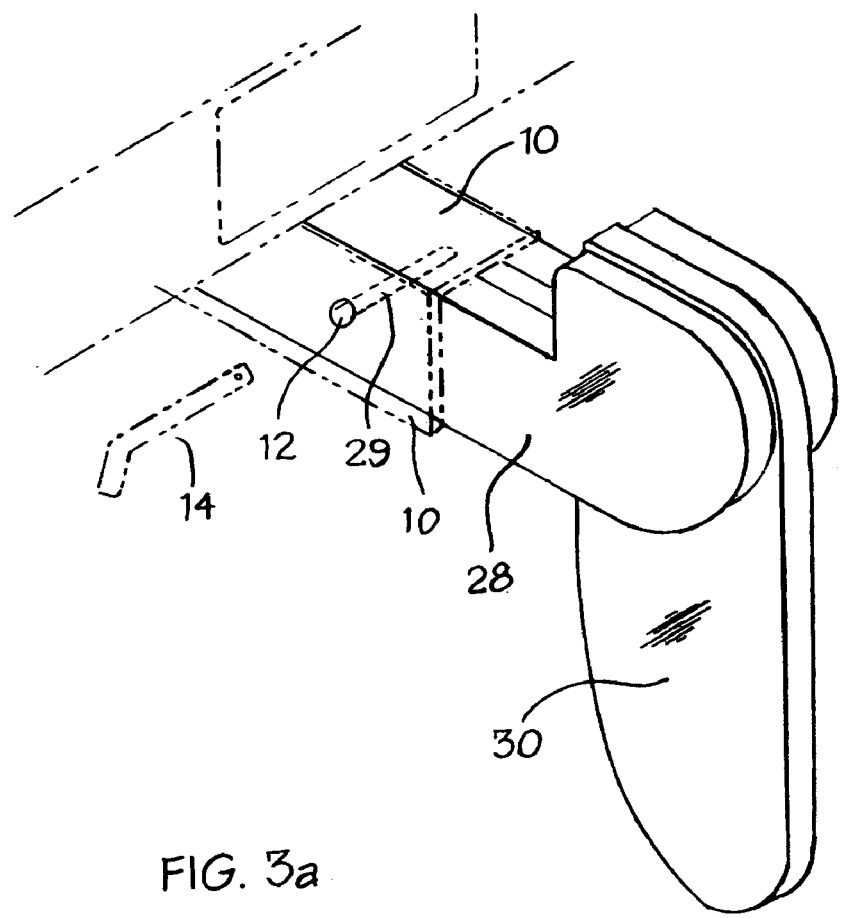
FIG. 3a shows a perspective view of the invention with no movement.

Referring to FIG. 3a, there is shown a perspective view of an alternate embodiment whereby the rudder blade is a fixed part of the assembly with no moving parts. Attachment of the invention is complete when the end of the rudder assembly 28 is inserted into a vehicles trailer hitch receiver 10 and retained with a hitch receiver retaining pin 14 through the retaining pin hole 12 and rudder assembly retaining bore 29.

Figure 3B:
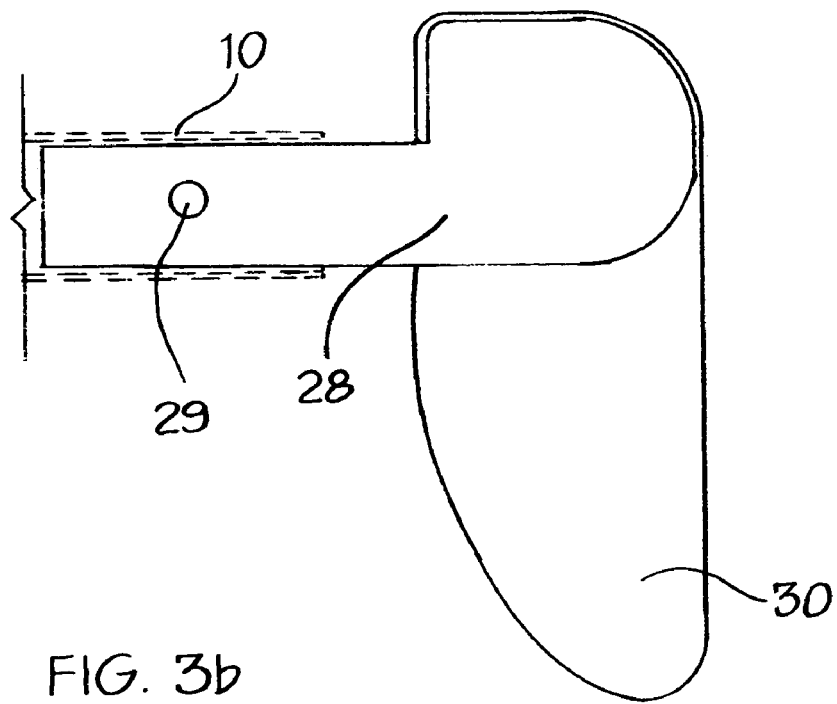
FIG. 3b shows a side view of the invention with no movement.

Referring to FIG. 3b, a side view is shown of the above mentioned alternate embodiment.

Accordingly, the reader will see that this invention will provide a simple durable and aesthetically pleasing addition to a vehicle that will cover up an unsightly receiver hitch while providing a way for sailors to identify themselves.

While the invention has been described in complete detail and pictorially shown in the accompanying drawings it is not to be limited to such details, since many changes and modifications may be made in the invention without departing from the spirit and scope thereof. Hence, it is described to cover any an all modifications and forms which may come within the language and scope of the appended claims.

What is claimed is:

1. A trailer hitch attachment that resembles a sailboat rudder designed to be releasable attached to a vehicle hitch receiver assembly comprising:

A rudder assembly,

A insert retainer having an outside perimeter which sized to be inserted in to the trailer hitch receiver, a bore being formed through an end of said insert retainer, said bore being disposed such that a retainer pin may be inserted through said trailer hitch receiver and said bore to retain said insert retainer relative to said trailer hitch.

2. A trailer hitch attachment as defined in claim 1, wherein said rudder assembly provides means for rotation of the rudder blade around a vertical axis in a limited arc.

3. A trailer hitch attachment as defined in claim 1, wherein said rudder blade assembly provides means for rotation of the rudder blade around a horizontal axis in a limited arc.

4. A trailer hitch attachment as defined in claim 1, wherein said rudder blade is fixed with no moving parts.

5. A trailer hitch attachment as defined in claim 1, wherein said insert retainer being a rectangular tube.

6. A trailer hitch attachment as defined in claim 1, wherein said insert retainer being a three sided channel.

7. A trailer hitch attachment as defined in claim 1, wherein said rudder blade assembly provides means for rotation of the rudder blade around both a horizontal axis in a limited arc and around a vertical axis in a limited arc.

* * * * *